(12) United States Patent
Joo

(10) Patent No.: US 7,386,470 B1
(45) Date of Patent: Jun. 10, 2008

(54) ADVERTISING SYSTEM AND METHOD USING INTERNET WEB BROWSER

(76) Inventor: Jin-Yong Joo, 201 Artvilla 586 Yangii-dong, Sujeong-ku, Seongnam-city, Kyonggi-do 461-250 (KR)

(*) Notice: Subject to any disclaimer, the term of this patent is extended or adjusted under 35 U.S.C. 154(b) by 0 days.

(21) Appl. No.: 09/763,144

(22) PCT Filed: May 26, 2000

(86) PCT No.: PCT/KR00/00541
§ 371 (c)(1),
(2), (4) Date: Apr. 29, 2001

(87) PCT Pub. No.: WO00/73950
PCT Pub. Date: Dec. 7, 2000

(30) Foreign Application Priority Data
May 27, 1999 (KR) .................. 1999-19320

(51) Int. Cl.
*G06Q 30/00* (2006.01)
*G06F 3/048* (2006.01)

(52) U.S. Cl. .................. 705/14; 715/856; 715/861
(58) Field of Classification Search .............. 705/14; 715/856, 861
See application file for complete search history.

(56) References Cited

U.S. PATENT DOCUMENTS

| | | | | |
|---|---|---|---|---|
| 6,032,162 A * | 2/2000 | Burke | ...................... | 715/501.1 |
| 6,307,544 B1 * | 10/2001 | Harding | ...................... | 345/709 |
| 6,393,407 B1 * | 5/2002 | Middleton et al. | ............. | 705/14 |
| 6,442,529 B1 * | 8/2002 | Krishan et al. | ................ | 705/14 |
| 6,628,314 B1 * | 9/2003 | Hoyle | ........................ | 345/854 |
| 6,664,987 B1 * | 12/2003 | Tarbox et al. | .............. | 345/853 |
| 6,865,719 B1 * | 3/2005 | Nicholas, III | ............... | 715/856 |

FOREIGN PATENT DOCUMENTS

| JP | 10-312344 | 11/1998 |
|---|---|---|
| JP | 10-320336 | 12/1998 |
| JP | 11-96175 | 4/1999 |

OTHER PUBLICATIONS

Graham, Ian S., The HTML Sourcebook, 1996, John Wiley & Sons, Inc., 2nd ed., p. 107.*

* cited by examiner

*Primary Examiner*—Jeffrey D. Carlson
(74) *Attorney, Agent, or Firm*—Lowe Hauptman Ham & Berner LLP

(57) ABSTRACT

There is provided an advertising system and method using an Internet web browser, in which one of a menu bar, location bar, tool bar, etc. in the screen of the web browser, that is not used for displaying information from a server, is used for displaying advertisements, during a period of time for which function commands are not inputted, thereby improving effectiveness of advertisement. The advertising method using a web browser is constructed in such a manner that a moving state of a cursor is detected when a web browser is activated to be displayed, an advertising logo or phase is displayed at a portion above a text box when it is detected that the cursor is not positioned at a command input box such as menu bar, tool bar, location bar, etc., and a corresponding command input bot at which the cursor is located is displayed to receive a control signal from a user when it is detected that the cursor is placed at one of the menu bar, tool bar, location bar, etc.

3 Claims, 4 Drawing Sheets

ADVERTISING SYSTEM AND METHOD USING INTERNET WEB BROWSER

BACKGROUND OF THE INVENTION

1. Field of the Invention

The present invention relates to an advertising system and method using a web browser serving as an Internet surfing tool, specifically, to an advertising system and method using an Internet web browser, in which one of a menu bar, location bar, tool bar, etc. in the screen of the web browser, that is not used for displaying information from a server, is used for displaying advertisements during a period of time for which function commands are not inputted, thereby improving effectiveness of advertisement.

2. Description of the Related Art

With the popularization of the Internet, web browsers used for Internet surfing are installed in almost all computers. The web browser is a kind of program which converts contents transmitted from a server computer into a form that users can visually recognize according to a communication protocol (HTML) to display the converted form on the computer monitors of the users.

Due to free charge on Internet information service, most of servers providing information advertise manufacturing and sales companies instead of charging on their clients, to thereby make a profit. That is, most of information providers display an advertisement of a specific company in a part of a web browser when clients access a server computer, and collect advertising rates from the company for that advertisement.

In conventional advertisements using the web browsers, however, advertising logos or phrases are displayed in a part of a web browser's text window used for displaying information stored in the server. This reduces the amount of information displayed on the screen of computer monitors and gives bad images to the clients. Especially, some clients have an aversion to advertisements displayed in the text window and even disconnect with the server. Accordingly, advertising impact is reduced.

SUMMARY OF THE INVENTION

It is, therefore, an object of the present invention to provide an advertising system and method using a web browser, which uses a menu bar, location bar, tool bar or status line in the screen of the web browser, that is not used for displaying texts, for displaying advertisements during a period of time for which function commands are not inputted from users, thereby improving effectiveness of advertisement.

Another object of the present invention is to provide an advertising system and method using a web browser, in which advertisements are not displayed in the screen of the web browser used for displaying information transmitted from a server computer to increase the amount of information displayed on the screen, providing a large quantity of information.

To accomplish the objects of the present invention, there is provided an advertising method using a web browser, in which a moving state of a cursor is detected when a web browser is activated to be displayed, an advertising logo or phrase is displayed at a portion above a text box when it is detected that the cursor is not positioned at a command input box such as menu bar, tool bar, location bar, etc., and a corresponding command input box at which the cursor is located is displayed to receive a control signal from a user when it is detected that the cursor is placed at one of the menu bar, tool bar, location bar, etc. A period of time consumed for using the web browser is measured for each client, to pay clients for using the web browser on which advertisements are displayed or to bestow a favor of free Internet subscription or free services on the clients, to thereby increase effectiveness of advertisement.

An advertising method using a web browser is constructed in such a manner that a moving state of a cursor 60 is detected when a web browser 10 is activated to be displayed, an advertising logo or phrase is displayed at a portion above a text box when it is detected that the cursor 60 is not positioned at a command input box such as menu bar 20, tool bar 30, location bar 40, etc., and a corresponding command input box at which the cursor 60 is located is displayed to receive a control signal from a user when it is detected that the cursor 60 is placed at one of the menu bar 20, tool bar 30, location bar 40, etc.

Upon the user subscribing to an advertisement agency, a period of time consumed for using the Internet is measured in such a manner that a web browser program informs the advertisement agency of the user's ID and a period of time consumed for using the web browser when the user initially accesses the Internet and also notifies the agency of a point of time when using of the web browser is finished, and the advertisement agency accumulates the period of time during which the user has used the web browser while using the Internet to monthly pay an amount of money in proportion to the period of time used on the account of the user.

To accomplish the objects of the present invention, there is provided an advertising system using a web browser, which employs an a client PC, a server and an open network connecting the client PC and the server to each other, in which the client PC has a web browser which detects the movement of a mouse cursor displayed on its monitor and, when the cursor is located in a text box thereof, displays an advertisement screen on at least one of the menu bar, tool bar, location bar and logo thereof.

To accomplish the objects of the present invention, there is also provided an advertising system using a web browser, which employs an a client PC, a server and an open network connecting the client PC and the server to each other, the client PC having: a web browser connecting it to the open network; and an auxiliary program which detects the movement of a mouse cursor displayed on its monitor and, when the cursor is located in a text box of the web browser, displays an advertising screen on at least one of the menu bar, tool bar, location bar and logo of the web browser.

The server stores a plurality of advertisement screens and transmits a part of them to the client PC at the request of the client PC or at predetermined time intervals, the advertisement screen disappears when the cursor moves to portions other than a specific portion thereof, and the logo is a unique symbol of a specific web browser producing company.

To accomplish the objects of the present invention, there is provided an advertising method using a web browser, which employs an a client PC, a server and an open network connecting the client PC and the server to each other, the advertising method comprising: an operation detecting step of detecting that the web browser is activated in the client PC; an advertisement display step of displaying an advertisement screen on at least one of a menu bar, a tool bar, a location bar and a logo of the web browser when the web browser is being activated and a mouse cursor is positioned in a text box of the web browser; and a menu display step of displaying a menu screen not the advertisement screen when the web browser is being activated and the mouse cursor is positioned on at least of the menu bar, the tool bar, the location bar and the logo of the web browser.

The advertising method further comprises an advertisement updating step of receiving the advertisement screen from the server at the request of the client PC or at predetermined time intervals.

The server checks a period of time consumed for the client PC to use the web browser to pay an amount of money in proportion to the checked period of time to a user of the client PC, and the period of time corresponds to the duration for which the advertisement screen is displayed on the web browser.

According to the present invention, the menu bar, location bar or tool bar in the screen of the web browser, that is not used for displaying information from a server, is used for displaying advertisements during a period of time for which function commands are not inputted from users, thereby improving effectiveness of advertisement. In addition, with the increase in the amount of information displayed in the text box of the web browser, users can acquire a larger quantity of information for a short period of time.

DETAILED DESCRIPTION OF THE PREFERRED EMBODIMENT

Figure 1:
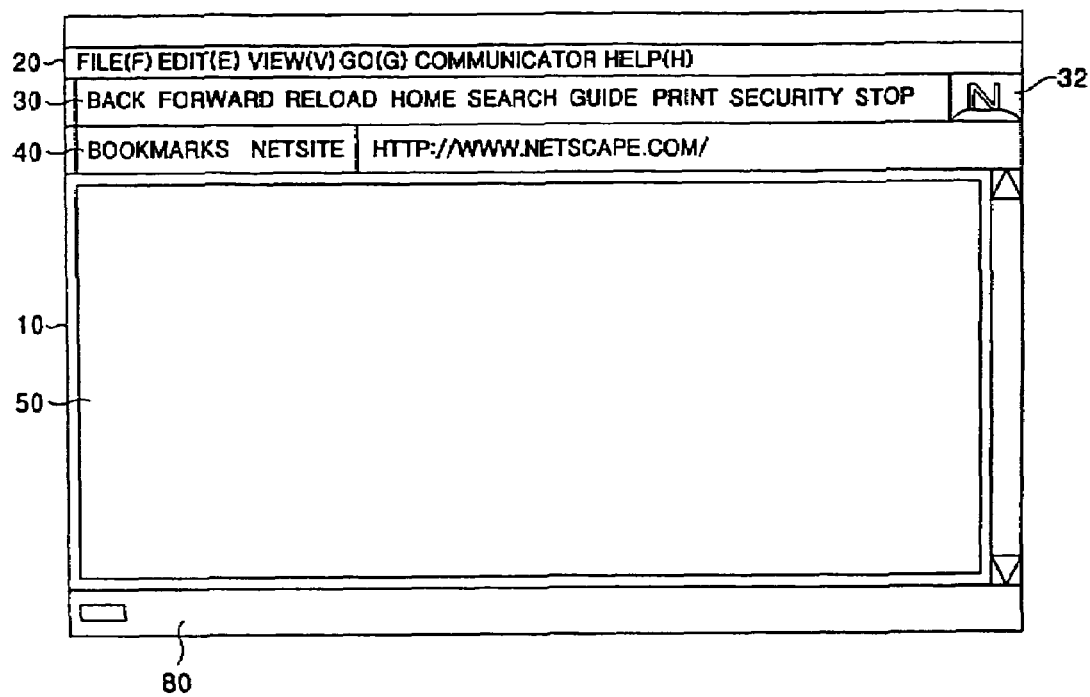
FIG. 1 shows the screen of a conventional web browser.

The advertising system and method using a web browser according to the present invention is explained below with reference to the attached drawings.

The present invention provides the advertising system and method using function display windows of the screen of a web browser which are not used for displaying information from a server. When a web browser 10 is activated to be displayed on a user's computer monitor, a moving state of a cursor 60 is detected. When it is detected that the cursor 60 is not positioned at a command input box such as menu bar 20, tool bar 30 or location bar 40, an advertising logo or phrase is displayed at the portion above a text box 50. On the other hand, when it is detected that the cursor 60 is located at one of the menu bar 20, tool bar 30 and location bar 40, a corresponding command input box at which the cursor 60 is positioned is displayed to receive a control signal from the user.

A navigator web browser 10 of Netscape is explained with reference to FIG. 1. Upon activation of the web browser 10, a menu bar 10, tool bar 30, location bar 40, etc. are displayed at the upper portion of the screen of a monitor, a text box 50 is displayed at its lower portion and a status line 80 is displayed at its bottom. A personal tool bar is omitted for convenience of explanation.

The menu bar 20 has submenus such as "File", "Edit", "View", "Go", "Communicator" and "Help". With clicking on a submenu with the cursor 60, the corresponding submenu is displayed in the pull-down mode. When a user clicks on a desired menu using the cursor 60, a screen based on the designated menu is displayed on the monitor so that the user can execute the function.

The tool bar 30, positioned below the menu bar 20, has subfunctions such as "Back", "Forward", "Reload", "Home", "Search", "Guide", "Print", "Security" and "Stop". That is, the tool bar 30 is an additional tool box containing functions, being frequently used, among the menus. The location bar 40 has functions of "Bookmarks" and "Netsite". The location bar 40 displays the uniform resource location (URL) of a accessed site and is constructed in such a manner that an address is inputted to access a desired site.

The text box 50, positioned under the location bar 40, displays information transmitted from the server. The above-described conventional web browser 10 displays the menu bar 20, tool bar 30 and location bar 40 all the time without regard to the contents of the text box 50.

Figure 2:
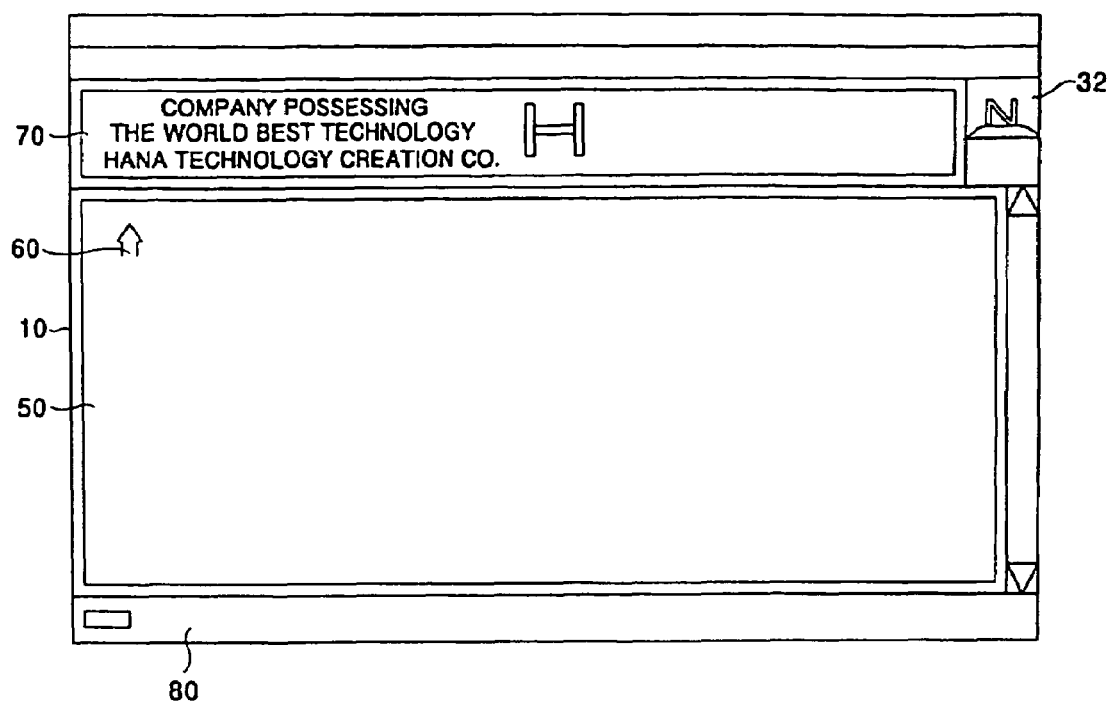
FIG. 2 shows the screen of a web browser on which an advertising logo is displayed according to an embodiment of the present invention.

In the present invention, an advertising logo 70 is displayed instead of the menu bar 20, tool bar 30 and location bar 40, as shown in FIG. 2. This advertising logo 70 may be previously inputted by a web browser producing company when the program is constructed. Otherwise, the advertisement may be made using an auxiliary program which displays the advertising logo 70 instead of the menu bar 20, tool bar 30 and location bar 40. Furthermore, the specific advertising logo 70 displayed in the web browser 10 can be constructed in such a manner that it is updated with other advertisements through the Internet. This is accomplished by conventional techniques. Moreover, the advertising logo 70 can be inserted using a separate external program.

When the user operates the web browser 10, a web browser program loaded in a computer memory detects the location of the cursor 60. When it is detected that the cursor 60 is placed in the text box 50, it is judged that the user is reading the contents of a text, displaying the predetermined advertising logo 70 at the position of the menu bar 20, tool bar 30 and location bar 40. On the other hand, when the cursor 60 is positioned on one of the menu bar 20, tool bar 30 and location bar 40, they are displayed to allow the user to input a command for executing a specific function, as shown in FIG. 1.

Accordingly, the user can output a larger amount of information than in the conventional case where advertisements are displayed in the text box 50. This improves the images of advertisements. In addition, a larger quantity of information can be displayed in the text box 50 without impeding the operation of the web browser 10.

Though the advertising logo is displayed on the upper portion of the screen of the web browser 10 including the menu bar 20, tool bar 30, location bar 40, etc. in the aforementioned embodiment, it is obvious that advertisements in the form of logo or phrase can be displayed on the status line 80 displaying "security display", "receiving status indicator", "component bar", etc., being located under the text box 50.

Figure 3:
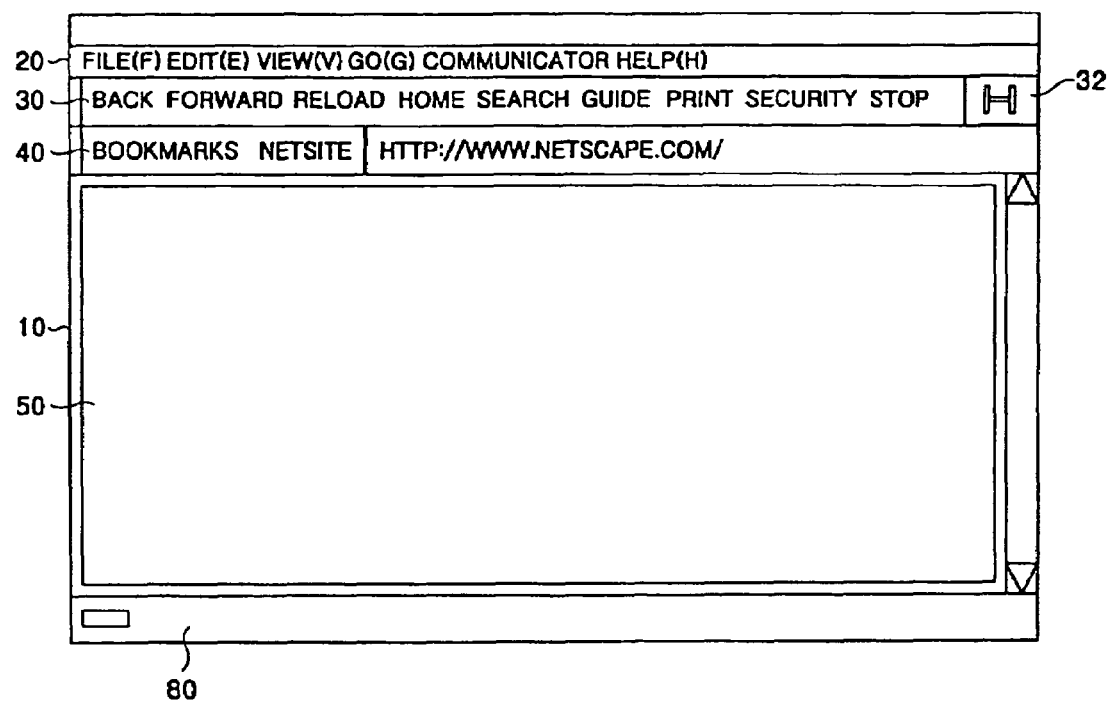
FIG. 3 shows the screen of a web browser on which an advertising logo is displayed according to another embodiment of the present invention.
Figure 4:
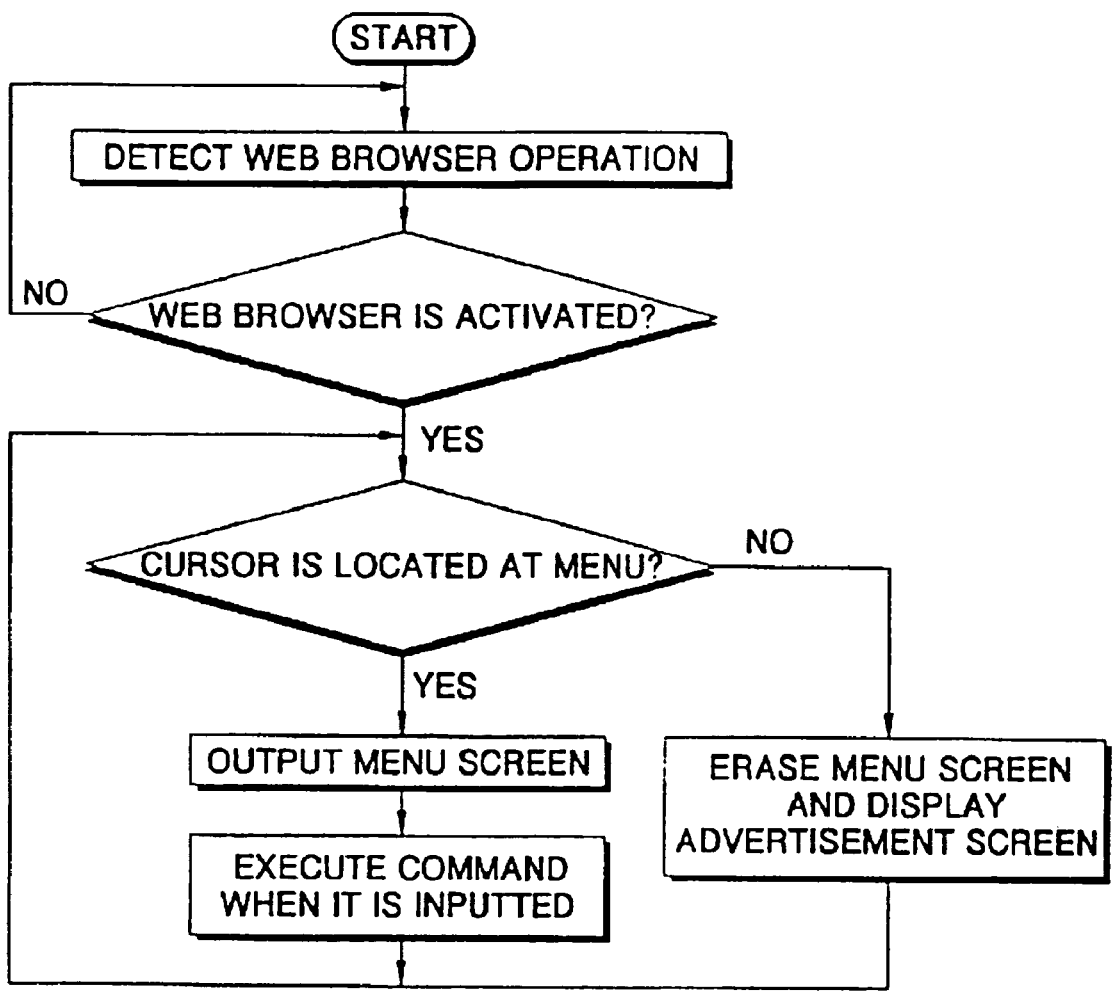
FIG. 4 is a flow chart showing an advertising method according to the present invention.

FIG. 3 illustrates another embodiment which uses a box where a logo 32 of the web browser company is displayed instead of the menu bar 20, tool bar 30 and location bar 40 for advertising. The conventional web browser 10 employs a method operating the logo 32 for indicating the standby state during data transmission/reception for transfer to other screens or sites while accessing the Internet. For example, a logo representing a shower of stars operates in the web browser of Netscape. Co. while a logo representing a revolving globe operates in the web browser of Microsoft. Co. As described above, the web browser company's logo is replaced with the logo of a specific company for advertising, gaining adverting impact. In this case, only the logo 34 may be used for advertising while the menu bar 20, tool bar 30 and location bar 40 are normally displayed, or all of the logo 34, menu bar 20, tool bar 30 and location bar 40 may be used for advertising simultaneously.

For the purpose of executing the advertising method of the present invention more effectively, clients using the web browser according to the present invention are registered and a period of time consumed for using the web browser is measured for each client, to pay them for using the web browser in proportion to the period of time or to bestow a favor of free Internet subscription or free services on the clients, to thereby increase the number of users.

Specifically, in case where a user carries out Internet surfing using a web browser to which the advertising method of the present invention is applied, upon the user subscribing to a web browser producing company or advertisement agency, a period of time consumed for using the Internet is measured in such a manner that the web browser program informs the company to which the user subscribes of the user's ID and a period of time consumed for using the web browser when the Internet is initially accessed and also notifies the company of a point of time when using of the web browser is finished.

A corresponding advertisement agency can increase the number of users by using a method that accumulates the period of time during which the user has used the web browser while using the Internet to monthly pay an amount of money in proportion to the period of time used on the account of the corresponding user. Furthermore, with the increase in the number of users, it is possible to collect a larger quantity of advertising rates from companies displaying their advertisements in the web browser. Here, the period of time consumed for using the web browser is calculated only when the user has accessed the Internet, not measured when using the web browser off-line.

While certain embodiments and details have been shown for the purpose of illustrating the present invention, it will be apparent to those skilled in the art that various changes and modifications may be made herein without departing from the spirit or scope of the invention.

What is claimed is:

1. An advertising system, using a web browser, said system comprising:
   a client PC;
   a server; and
   a network connecting the client PC and the server;
   wherein the client PC comprises the web browser programmed to detect a movement of a cursor displayed in a display screen on a monitor of the client PC, and, when the cursor is located in a text box of the web browser, to display an advertisement in an area of the display screen where at least one of a menu bar, tool bar, a location, and browser logo of the web browser is to be displayed, instead of displaying the at least one of the menu bar, tool bar, location bar, and browser logo in the area,
   wherein the server stores a plurality of advertisements and is operable to transmit at least one advertisement to the client PC, for display as the advertisement, at a request of the client PC or at predetermined time intervals, and
   wherein the web browser is further programmed for causing the advertisement to disappear and for displaying the at least one of the menu bar, tool bar, location bar, and browser logo in the area when the cursor is located in the area of the display screen where the at least one of the menu bar, tool bar, location bar, and browser logo is to be displayed.

2. An advertising system, using a web browser, said system comprising:
   a client PC;
   a server;
   a network connecting the client PC and the server,
   wherein the client PC comprises
   the web browser; and
   an auxiliary program, other than the web browser, which, when executed by the client PC, is capable of detecting a movement of a cursor displayed in a display screen on a monitor of the client PC, and, when the cursor is located in a text box of the web browser, controlling the display of an advertisement in an area of the display screen where at least one of a menu bar, tool bar, location bar, and browser logo of the web browser is to be displayed, instead of displaying the at least one of the menu bar, tool bar, location bar, and browser logo in the area,
   wherein the server stores a plurality of advertisements and is operable to transmit at least one advertisement to the client PC, for display as the advertisement, at a request of the client PC or at predetermined time intervals, and
   wherein said auxiliary program, when executed by the client PC, is further capable of causing the advertisement to disappear and displaying the at least one of the menu bar, tool bar, location bar, and browser logo in the area when the cursor is located in the area of the display screen where the at least one of the menu bar, tool bar, location bar, and browser logo is to be displayed.

3. An advertising method using a web browser in a system comprising a client PC, a server, and a network connecting the client PC and the server, the advertising method comprising, upon detection that the web browser has been activated in the client PC:
   displaying an advertisement, in an area of a display screen of the browser for displaying at least one of a menu bar, a tool bar, a location bar, and a logo of the browser, instead of the at least one of the menu bar, the tool bar, the location bar, and the logo of the web browser when the web browser is being displayed and when a cursor is detected to be positioned in a text box of the web browser, outside of the area of the display screen for displaying the at least one of the menu bar, the tool bar, the location bar, and the logo of the browser;
   displaying in the area at least one of the menu bar, the tool bar, the location bar, and the logo of the web browser, instead of the advertisement, when the web browser is being displayed and the cursor is detected to be positioned in the area of the display screen for displaying the at least of the menu bar, the tool bar, the location bar, and the logo of the web browser; and
   receiving an advertisement update from the server at a request of the client PC or at predetermined time intervals.

* * * * *